(12) United States Patent
Bender et al.

(10) Patent No.: US 7,537,365 B2
(45) Date of Patent: May 26, 2009

(54) GLARE REDUCING ENHANCEMENTS FOR VEHICLE EXTERIOR LIGHTING SYSTEMS

(75) Inventors: Burnell L. Bender, Woodburn, IN (US); Allen R. Wittman, Convoy, OH (US); Jason E. McVay, Fort Wayne, IN (US); Joseph R. Turner, Huntertown, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 300 days.

(21) Appl. No.: 11/382,566

(22) Filed: May 10, 2006

(65) Prior Publication Data
US 2007/0263399 A1    Nov. 15, 2007

(51) Int. Cl.
*F21S 8/10* (2006.01)
(52) U.S. Cl. .................. 362/512; 362/539; 362/507
(58) Field of Classification Search ................ 362/512, 362/507, 538, 539, 506, 469, 460, 465
See application file for complete search history.

(56) References Cited

U.S. PATENT DOCUMENTS

| | | | | |
|---|---|---|---|---|
| 1,326,017 A | * | 12/1919 | Brisbois et al. | 362/512 |
| 2,609,269 A | * | 9/1952 | Ryan et al. | 427/163.1 |
| 3,032,645 A | * | 5/1962 | Wilfert | 362/507 |
| 6,457,849 B2 | * | 10/2002 | Tsukamoto | 362/509 |

FOREIGN PATENT DOCUMENTS

DE          3220500 A   * 12/1983

* cited by examiner

*Primary Examiner*—Sharon E Payne
(74) *Attorney, Agent, or Firm*—Mark C. Bach; Jeffrey P. Calfa (57) ABSTRACT

An exterior lighting system of a motor vehicle (10) has headlamps (12) and foglamps (14) for illuminating a field of view. The headlamps have lenses (26) through which light passes to illuminate the field of view and are constructed to alter the light that is directed within the headlamps toward upper zones (26A) of the lenses relative to light that is directed toward lower zones (26B) of the lenses when both headlamps and foglamps are shining onto the field of view so as to attenuate headlight glare that would otherwise be seen by a driver of the vehicle looking toward the field of view in the absence of the light alteration. Various embodiments of inventive headlamps are shown.

10 Claims, 6 Drawing Sheets

GLARE REDUCING ENHANCEMENTS FOR VEHICLE EXTERIOR LIGHTING SYSTEMS

FIELD OF THE INVENTION

This invention relates generally to external lighting systems of motor vehicles. More specifically it relates to enhancements for reducing headlight glare, especially from low-beam headlamps, that tends to obstruct a driver's field of view when shining into fog.

BACKGROUND OF THE INVENTION

When the driver of a motor vehicle that is equipped with foglamps, a large truck for example, encounters fog, he or she will turn on the foglamps. In certain vehicles, this will also cause the low-beam headlamps to illuminate. Alternatively, it may be mandatory for the low-beams to be on in order for the foglamps to illuminate when the latter are switched on.

The concurrent use of both foglamps and headlamps, particularly the low-beam headlamps, to illuminate the driver's field of view in fog may create a condition where upwardly shining portions of the headlight beams striking fog create glare that impairs the driver's view. While foglamps are typically aimed to shine lower than low-beam headlamps for illuminating the forward field of view, especially the road surface farther ahead, the presence of glare from the headlamps can obstruct, or to some extent impair, the driver's view that the lighting system is intended to illuminate.

Consequently, it is believed that improvements for reducing headlight glare in such circumstances would be desirable.

SUMMARY OF THE INVENTION

The present invention is directed toward providing such improvements.

The beam width and beam height of a headlight beam emitted from a headlamp are largely a function of the arrangement of headlamp components, including the bulb, the reflector, and the lens, that define the headlamp's optical characteristics. The headlamps of motor vehicles sold in the United States must comply with relevant regulations. In general, a low-beam headlamp should direct its beam slightly downward, meaning that the beam axis will be slightly inclined downward from horizontal as it leaves the vehicle.

The beam height will however have an angular span that causes some of the light to shine above horizontal. It is believed that current U.S. government standards do not specify photometric standards for low-beam headlamp illumination more than 2° above horizontal.

The inventors have observed that headlight glare that interferes with a driver's view of a road surface being illuminated by foglamps seems to come from that portion of the beam shining above horizontal. As a result of this recognition, the inventors have been able to provide enhancements to headlamps for reducing the undesirable influence of headlight glare on foglamp illumination. The enhancements comprise novel design features that are incorporated in headlamps to act on that portion of a low-filament headlight beam shining above horizontal.

The invention is well-suited for incorporation in composite-type headlamps currently used in many motor vehicles. Such a headlamp comprises a lens that is often uniquely styled to a particular vehicle make and model. The nature of a composite-type headlamp enables the inventive features to be embodied in the lens itself and/or by the inclusion of accessory devices associated with the lens.

One embodiment of the invention comprises a visor that is selectively positionable for covering an upper portion of a lens from which glare-creating light would otherwise be emitted when the headlamp is shining into fog with the foglamps on. When the foglamps are off, the visor is positioned in non-covering relation to the lens.

The visor can, for example, be arranged on the interior of a composite headlamp to move up and down in relation to the lens, covering the upper portion of the lens when down and being retracted when up to a position that does not affect the headlight beam. Operation of the visor can be slaved to operation of the foglamps, moving to down position when the foglamps are turned on and moving to up position when the foglamps are turned off. A small pneumatic actuator can be used as the prime mover that acts on the visor to move it down against the force of a return spring that pulls it back up when the pneumatic actuator ceases to be actuated.

Another embodiment of the invention comprises a visor for covering more than just an upper portion of a lens. The visor comprises two distinct zones, an upper substantially opaque zone, black for example, and a lower transparent, but tinted zone, yellow or amber for example. When the visor is moved to cover the lens, the opaque zone covers the upper portion of the lens to reduce glare while the tinted zone covers a lower portion of the lens to provide better light penetration into fog.

Another embodiment of the invention comprises a louvered grille over the upper portion of the lens for directing more horizontally, or perhaps even somewhat downwardly, what would otherwise become glare-creating light, thereby disallowing light from shining more than substantially about 2° above horizontal.

Still another embodiment of the invention comprises a liquid crystal layer associated with the upper portion of the lens, either in a separate element disposed over the upper portion of the lens or being integrated directly into the lens itself. The liquid crystal medium is selectively operated to opaque and non-opaque states by the selective application of an electric voltage to the liquid crystal material in coordination with foglamp use.

Still another embodiment of the invention comprises a first liquid crystal layer associated with the upper portion of the lens, as described above, and a second liquid crystal layer associated with a lower portion of the lens below the upper portion. Operation of the second layer is also coordinated with foglamp operation but instead of blocking light like the first liquid crystal layer when the foglamps are on, the second liquid crystal layer filters the generally white light from the bulb to allow only yellow or amber light to shine through, thereby providing better light penetration into fog.

Still another embodiment of the invention comprises a lens that has no visor nor that is selectively operated from one state to another. The upper portion of the lens comprises a filter that allows only yellow or amber light to shine through while the lower portion is transparent to the white light from the filament. In a modified form of this embodiment, the upper portion of the lens can have a mirror tint on its exterior so that a person looking at the headlamp would not readily notice the amber or yellow color that forms the filter.

Principles of the invention can benefit vehicles that do not have foglamps. Those principles allow a vehicle's headlamps, such as some of those described above, to be selectively operated to what is referred to here for convenience as a "fog-mode" state. When fog is present and low-beam headlamps are turned on, the headlamps may be operated to fog-mode state, such as by turning on a fog-mode switch. In that state, light that is directed within the headlamps toward upper zones of their lenses relative to light that is directed toward their lower zones below the upper zones is altered when the fog-mode switch is on, so as to attenuate headlight glare that would be much more noticeable by a driver of the vehicle looking toward the field of view in the absence of the light alteration provided by the invention.

One generic aspect of the present invention relates to an automotive vehicle comprising an exterior lighting system, comprising headlamps and foglamps, for illuminating a field of view frontally of the vehicle. The headlamps comprise lenses through which light passes to illuminate the field of view and are constructed to alter the light that is directed within the headlamps toward upper zones of the lenses relative to light that is directed toward lower zones of the lenses below the upper zones when both headlamps and foglamps are shining onto the field of view so as to attenuate headlight glare that would otherwise be seen by a driver of the vehicle looking toward the field of view in the absence of the light alteration.

Another generic aspect of the invention relates to an automotive vehicle headlamp comprising a housing, a light source within the housing, and a lens through which light originating at the light source passes for illuminating a field of view. The headlamp is constructed to alter the light that is directed from the light source within the headlamp toward an upper zone of the lens relative to light from the source that is directed toward a lower zone of the lens below the upper zone so as to attenuate headlight glare caused by light leaving the headlamp through the upper zone.

Still another aspect relates to an automotive vehicle comprising a headlamp system comprising one or more headlamps providing illumination of a forward field of view. Each headlamp comprises a housing containing an internal light source and a lens through which light originating at the light source passes for illuminating a field of view. Each headlamp can be selectively operated by a mode selection device to different modes, one of which is a fog-mode in which light that is directed from the light source within the housing toward an upper zone of the lens relative to light from the source directed toward a lower zone of the lens below the upper zone is acted upon so as to attenuate headlight glare created in the field of view in the presence of fog caused by light leaving the headlamp through the upper zone in comparison to glare created when the headlamp is in another mode.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
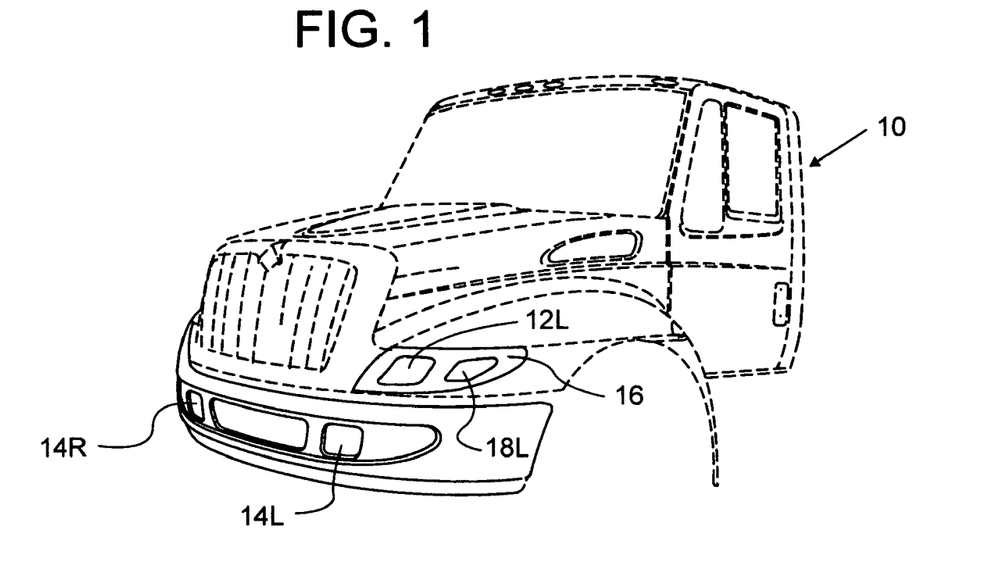
FIG. 1 is a partial perspective view of a motor vehicle looking toward the left front of the vehicle to show part of the exterior lighting system, including foglamps and a headlamp, embodying the present invention.

FIG. 1 shows a large truck 10 that has an exterior lighting system that includes right and left headlamps (only the left one 12L can be seen) and right and left foglamps 14R, 14L. Headlamp 12L is a composite-type that is part of a pod 16 that also includes a left turn/marker lamp 18L. Foglamp 14L is disposed lower and more toward the fore-aft centerline of the truck than headlamp 12L, and the same is true for foglamp 14R with respect to the right headlamp.

Figure 2:
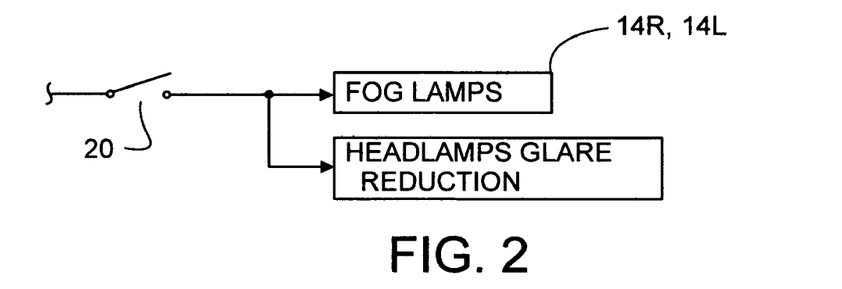
FIG. 2 is a circuit diagram relevant to certain aspects of the invention.

The operation of foglamps 14R, 14L is controlled by a switch 20, as shown by the circuit diagram of FIG. 2. If the low-beams of the headlamps are on and switch 20 is also on to illuminate the foglamps, the inventive headlamps provide glare reduction that gives the driver a better field of view in the presence of fog. The embodiments of FIGS. 3-8 show various headlamp constructions for providing glare reduction in the presence of fog when the foglamps are on.

Figure 3:
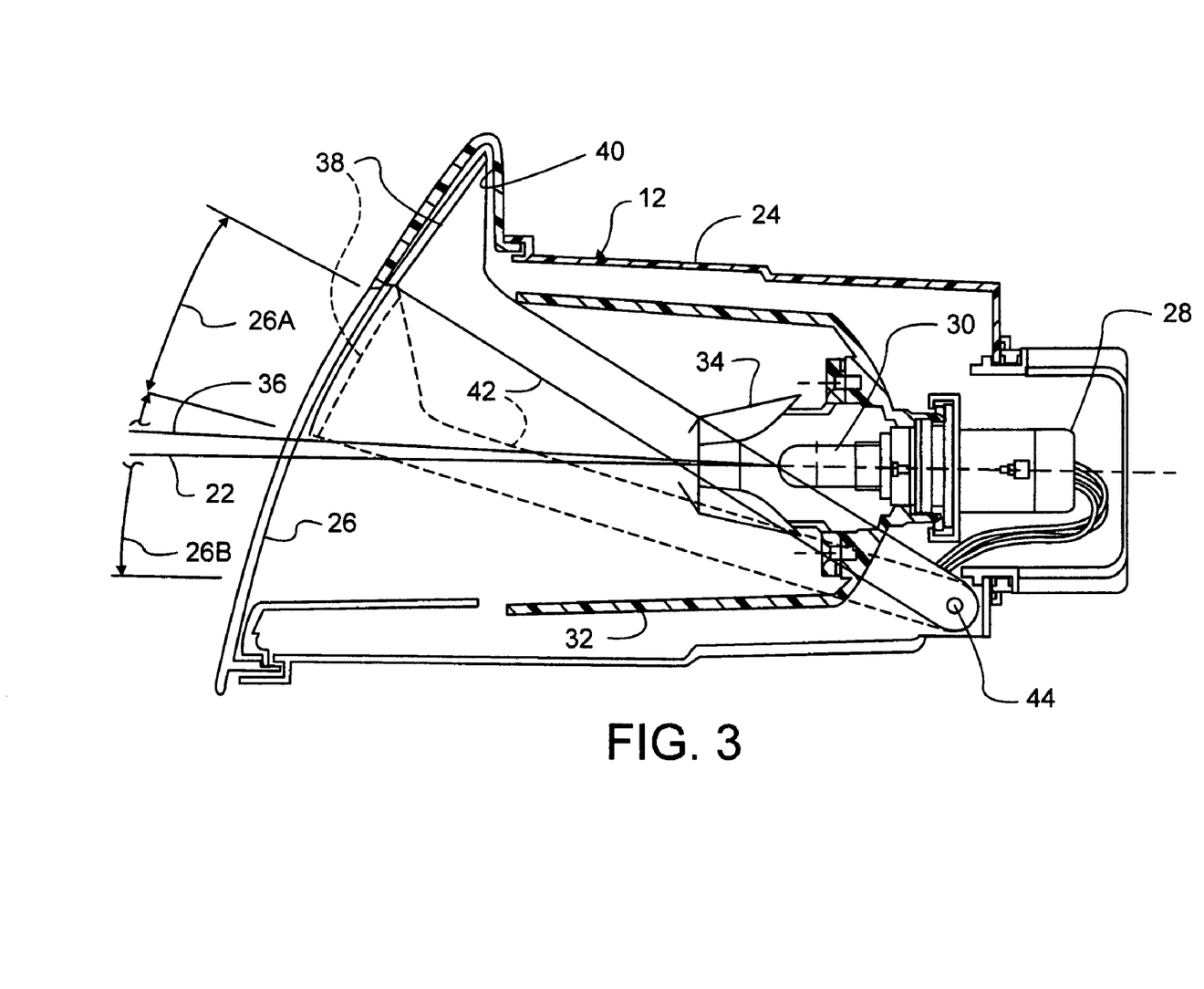
FIG. 3 is a longitudinal cross section view in elevation showing a first embodiment of headlamp forming a portion of the invention.

FIG. 3 shows a generic composite low-beam headlamp 12 having a centerline 22 and comprising various conventional parts including a housing 24, a lens 26, a lamp socket 28, a bulb 30, a reflector 32, and a bulb shield 34. Headlamp 12 is mounted in such a way on truck 10 as to place centerline 22 substantially horizontal, but with proper adjustment, the beam axis may be aimed slightly downward for low-beam illumination.

Lens 26 is transparent to allow the natural, generally white, color of the light emitted from bulb 30 to pass through. For purposes of describing the invention, lens 26 may be considered to have an upper zone 26A and a lower zone 26B that are demarcated by an imaginary line defined by the intersection of an imaginary plane 36 with the lens. Plane 36, as viewed edgewise, is inclined at 2° from centerline 22 about the low-beam filament of bulb 30.

When foglamps 14R, 14L are off, and the low-beam headlamps are on, light originating at bulb 30 passes through both zones 26A, 26B without obstruction.

When foglamps 14R, 14L and the low-beam headlamps are both on, light originating at bulb 30 passes only through lower zone 26B. This occurs because concurrent operation of both the foglamps and the headlamps causes an opaque (black for example) visor 38 to be placed in a position covering zone 26A (broken line position) thereby blocking light transmission through that zone. Housing 24 is shaped to provide a recess 40 within which visor 38 is disposed clear of zone 26A when concurrent operation of the headlamps and foglamps is not occurring.

The movement for positioning visor 38 comprises an arm 42 that pivots on housing 12 about an axis 44 at one end and that attaches to visor 38 at the opposite end. The movement is internal to housing 12 and is operated by a small prime mover (not specifically shown), such as a pneumatic actuator that is controlled by switch 20 to move the visor into covering relation with zone 26A when the headlamps and foglamps are both on against the opposing force of a return spring that retracts the visor into recess 40 when the pneumatic actuator ceases to be actuated.

Figure 4:
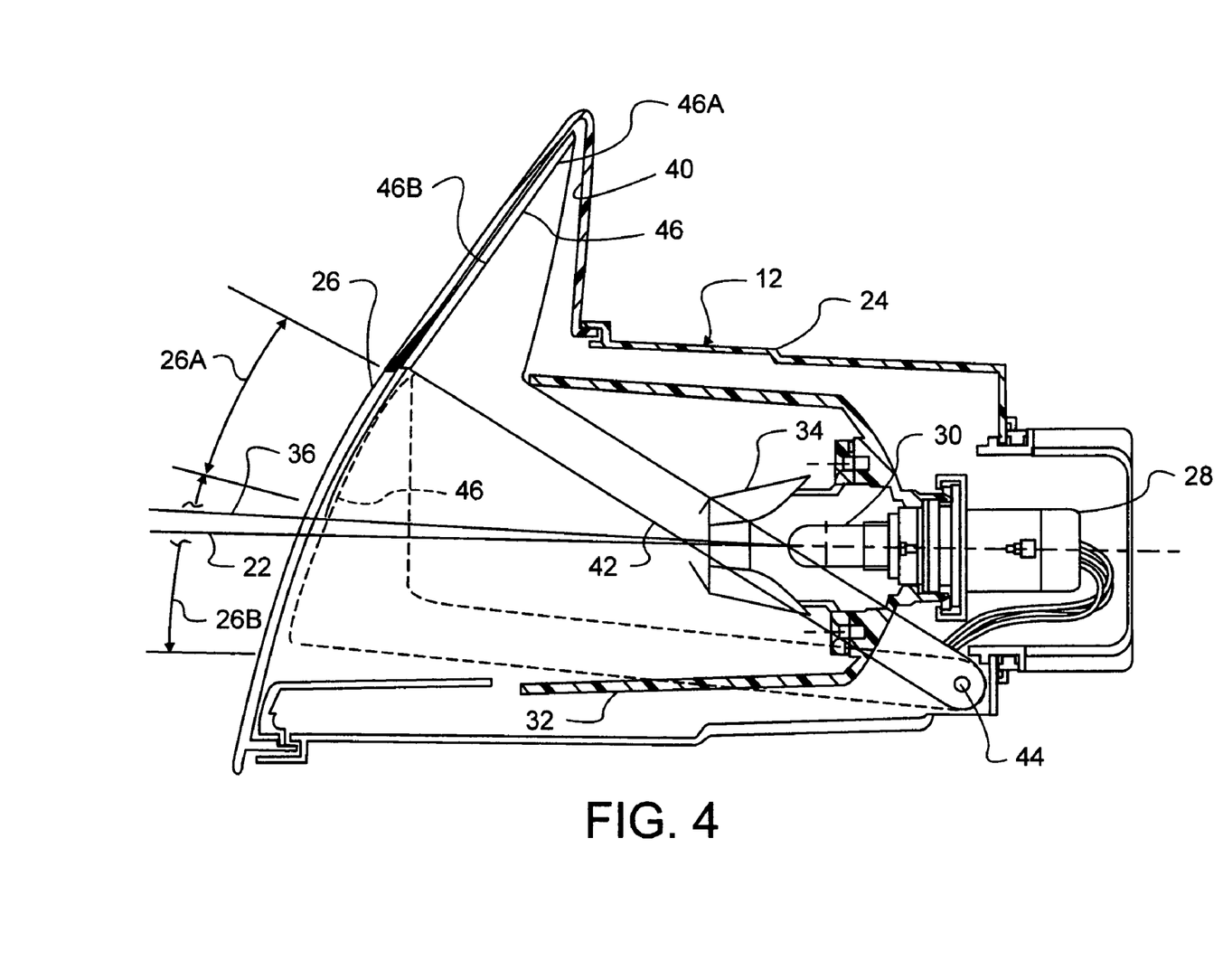
FIG. 4 is a longitudinal cross section view in elevation showing a second embodiment of headlamp.

FIG. 4 is an embodiment with sufficient similarities to that of FIG. 3 that like numerals can be used to designate like parts without need for repeated description. The FIG. 4 embodiment differs in that the visor, now identified in this Figure by the numeral 46, comprises two distinct zones, an upper zone 46A, that like visor 38 is opaque, and also a lower zone 46B below zone 46A. The latter zone is transparent, but tinted, yellow or amber for example.

When the pneumatic actuator moves visor 46 into covering relation with lens 26, visor zone 46A is covering lens zone 26A and visor zone 46B is covering lens zone 26B. Zone 46A covers the upper zone of lens 26 to reduce glare while the tinted zone 46B covers the lower zone of the lens to provide better light penetration into fog, like the fog lamps that also typically shine yellow or amber light. Recess 40 is large enough to contain both zones 46A, 46B when the visor is retracted clear of zones 26A, 26B.

Figures 5, 6:
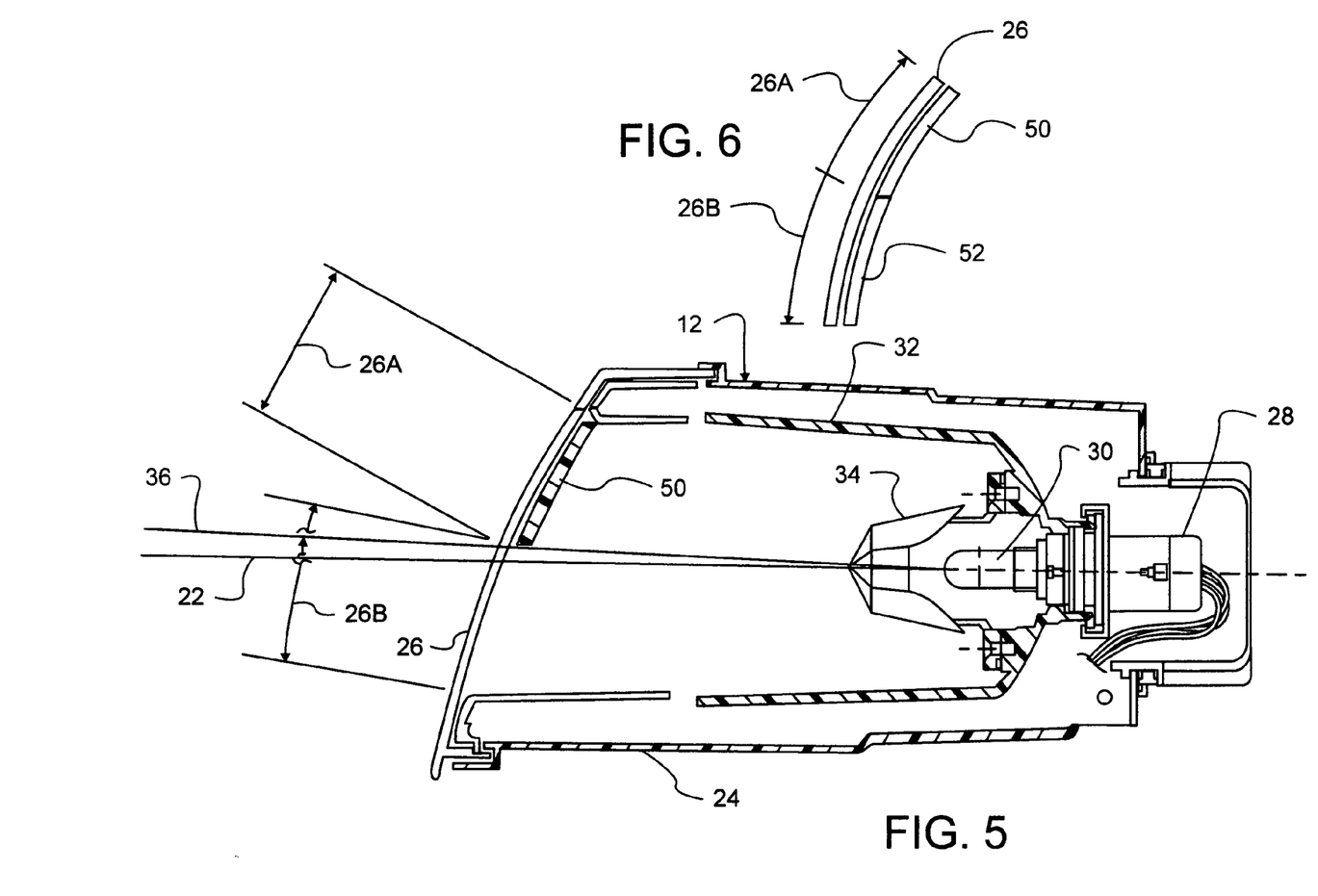
FIG. 5 is a longitudinal cross section view in elevation showing a third embodiment of headlamp.
FIG. 6 is a longitudinal cross section view in elevation showing a fourth embodiment of headlamp.

FIG. 5 is another embodiment that shows the same generic headlamp 12 having housing 24, lens 26, lamp socket 28, bulb 30, reflector 32, and bulb shield 34. Unlike the two prior embodiments, this one does not use a prime mover or arm for moving a visor. Rather, a liquid crystal element 50 is disposed within the interior of housing 12 directly behind zone 26A of lens 26.

Liquid crystal element 50 comprises a thin captured liquid crystal layer. The liquid crystal medium forming the layer is selectively operated to opaque and non-opaque states by the selective application of an electric voltage to it in coordination with foglamp use. When the foglamps are on, the layer is rendered opaque, which may be total or partial. Otherwise the layer is clear. In this way, this embodiment provides a glare-attenuating effect that is similar to the embodiment of FIG. 3.

FIG. 6 shows a portion of an embodiment like that of FIG. 5, but with the addition of a second liquid crystal element 52 disposed within the interior of housing 12 directly behind zone 26B of lens 26. Liquid crystal element 52 comprises a thin captured liquid crystal layer that changes opaqueness state with change in applied voltage, also coordinated with foglamp operation. However, instead of blocking light like liquid crystal element 50, element 52 filters the generally white light from the bulb to allow only yellow or amber light to shine through when the foglamps are on, thereby providing better light penetration into fog. Element 52 is clear when the foglamps are off. In this way, this embodiment provides a glare-attenuating effect similar to the embodiment of FIG. 4.

Figure 7:
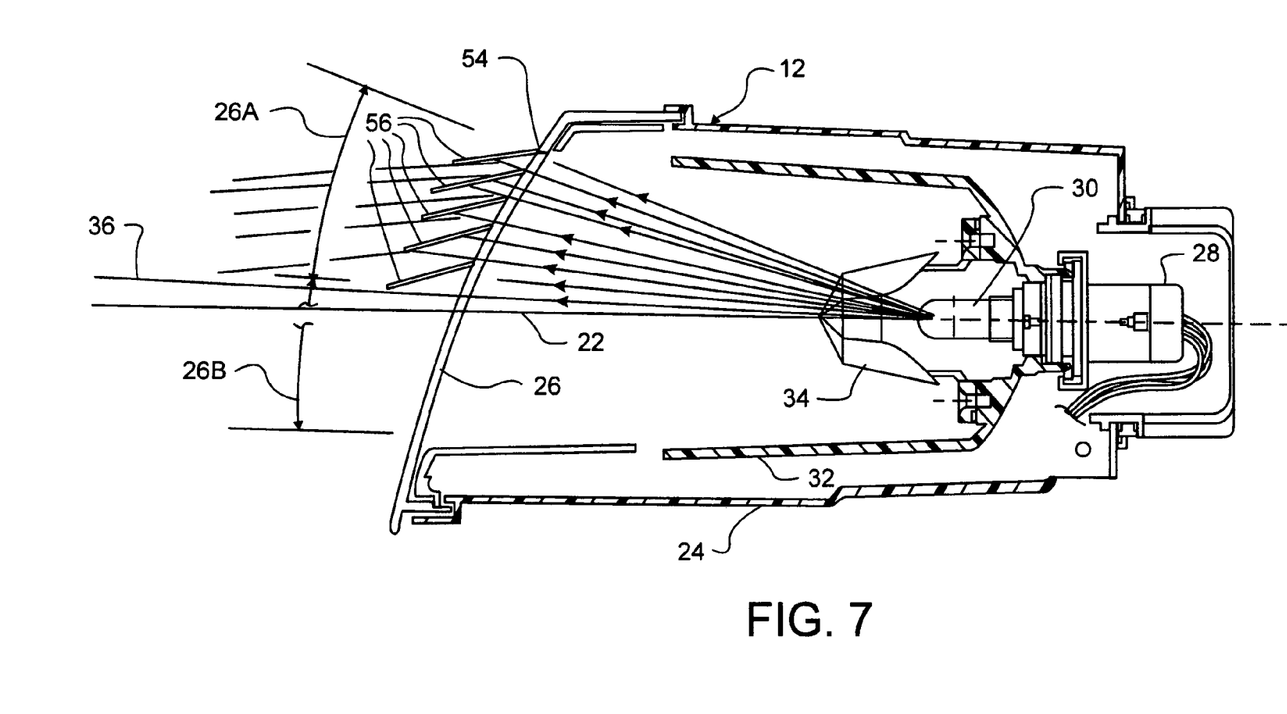
FIG. 7 is a longitudinal cross section view in elevation showing a fifth embodiment of headlamp.

FIG. 7 shows another embodiment that comprises the same generic headlamp 12 having housing 24, lens 26, lamp socket 28, bulb 30, reflector 32, and bulb shield 34. A louvered grille 54 is disposed in covering relation to the upper zone 26A of lens 26 on the exterior of the headlamp, being secured in any suitably appropriate way. The louvers are arranged for directing more horizontally, or perhaps even somewhat downwardly, what would otherwise become glare-creating light, thereby disallowing light from shining directly more than substantially about 2° above horizontal. Zone 26B is not covered and is always transparent.

Figure 8:
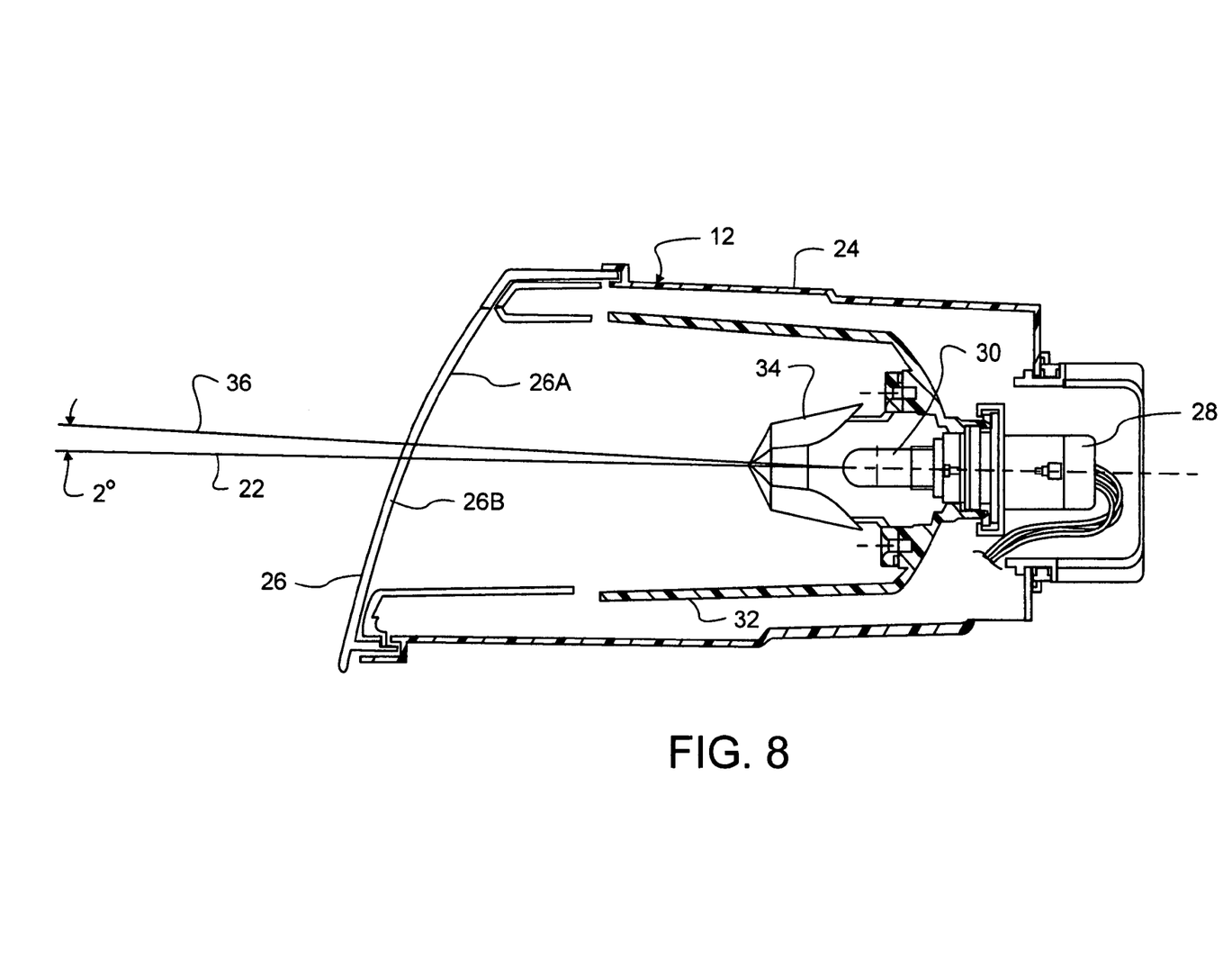
FIG. 8 is a longitudinal cross section view in elevation showing a sixth embodiment of headlamp.

FIG. 8 shows another embodiment that comprises the same generic headlamp 12 having housing 24, lens 26, lamp socket 28, bulb 30, reflector 32, and bulb shield 34. No visor, grille, nor liquid crystal elements are associated with lens 26. The upper zone 26A of the lens comprises a filter that allows only yellow or amber light to shine through while the lower zone 26B is transparent to the white light from the filament. In a modified form of this embodiment, the upper zone can have a mirror tint on its exterior so that a person looking at the headlamp would not readily notice the amber or yellow color that forms the filter.

As mentioned in the Background, principles of the invention can be of some benefit even to vehicles that do not have foglamps. A vehicle's headlamps, such as those described with reference to FIGS. 3-6, can be selectively operated to a "fog-mode" state by use of a fog-mode switch 21A shown in FIG. 2A.

Figure 2A:
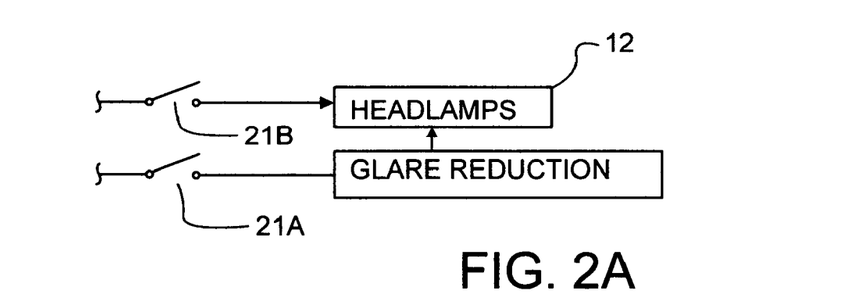
FIG. 2A is another circuit diagram relevant to certain aspects of the invention.

When fog is present, low-beam headlamps are turned on by a headlamp switch 21B, and the fog-mode state is selected by switch 21A, light that is directed within the headlamps toward upper zones of their lenses relative to light that is directed toward their lower zones below the upper zones is altered in the same way as described for each of the several headlamp embodiments that have been described here in order to attenuate glare. Optionally, the vehicle could also have foglamps that turn on with switch 21A.

The embodiments of FIGS. 7 and 8 that do not have movable features like those of FIG. 3-6 can function by themselves as foglamps when turned on.

While a presently preferred embodiment of the invention has been illustrated and described, it should be appreciated that principles of the invention apply to all embodiments falling within the scope of the following claims.

What is claimed is:

1. An automotive vehicle comprising:
   a headlamp system comprising one or note low-beam headlamps for providing low-beam illumination of a forward field of view;
   each headlamp comprising a housing containing an internal light source and a lens through which light originating at the light source passes for low-beam illumination of the field of view;
   one or more foglamps for illuminating the field of view;
   a switch that is selectively operable to turn the one or more foglamps on and off;
   the one or more one headlamps comprising a selectively operable device whose operation is slaved to the one or more foglamps to act, when the switch turns the one or more foglamps on, upon light that is directed from the light source within the housing toward an upper zone of the lens relative to light from the source directed toward a lower zone of the lens below the upper zone so as to thereby attenuate headlamp glare interference with a driver's view of a road surface being illuminated when the one or more headlamps and the one or more foglamps are both on in comparison to glare that would be present in the absence of the selectively operable device acting to attenuate the glare, and to not attenuate headlamp glare interference with a driver's view of a road surface being illuminated when the switch turns the one or more foglamps off.

2. An automotive vehicle as set forth in claim 1 wherein the selectively operable device comprises a visor that is selectively positionable relative to the lens.

3. An automotive vehicle as set forth in claim 2 wherein the visor comprises a zone that is selectively positionable to a first position covering the upper zone of the lens and a second position uncovering the upper zone of the lens.

4. An automotive vehicle as set forth in claim 3 wherein the zone of the visor comprises opaque materiel that blocks light transmission.

5. An automotive vehicle as set forth in claim 2 wherein the visor comprises upper and lower zones that are selectively positionable to a first position covering the upper and lower zones of the lens respectively and a second position uncovering the upper and lower zones of the lens.

6. An automotive vehicle as set forth in claim 1 wherein the lower zone and the upper zone are demarcated from each other by a plane that as viewed edgewise is inclined upwardly at an acute angle to the centerline of a low-beam element of the headlamp in a direction from the low-beam element toward the lens.

7. An automotive vehicle as set forth in claim 6 wherein the acute angle is 2°.

8. An automotive vehicle as set forth in claim 1 wherein the selectively operable device comprises a liquid crystal zone that is disposed in covering relation to the upper zone of the lens and that is selectively operated to opaque and non-opaque states by the selective application of an electric voltage to liquid crystal material in the zone.

9. An automotive vehicle as set forth in claim 8 wherein the selectively operable device comprises a further liquid crystal zone that is disposed in covering relation to the lower zone of the lens and that is selectively operated to tinted light-transmitting and clear light-transmitting states by the selective application of an electric voltage to liquid crystal material in the further zone.

10. An automotive vehicle comprising:
   an exterior lighting system, comprising low-beam headlamps and foglamps, for illuminating a field of view frontally of the vehicle,
   wherein the headlamps comprise lenses through which light passes to illuminate the field of view and are constructed to alter the light that is directed within the headlamps toward upper zones of the lenses relative to light that is directed toward lower zones of the lenses below the upper zones when both headlamps and foglamps are shining onto the field of view so as to attenuate low-beam headlamp glare that would otherwise be seen by a driver of the vehicle looking toward the field of view in the absence of the glare attenuation, the visors comprising upper and lower zones that are selectively positionable to a first position covering upper and lower zones of the lenses respectively when a switch is placed in a position that turns the foglamps on and a second position uncovering the upper and lower zones of the lenses when the switch is placed in a position that turns the foglamps off, and wherein the upper zones of the visors comprise opaque material that blocks light transmission and the lower zones of the visors comprise transparent, but tinted, material.

\* \* \* \* \*